United States Patent
Groh et al.

(10) Patent No.: US 10,934,460 B2
(45) Date of Patent: Mar. 2, 2021

(54) BINDER-CONSOLIDATED TEXTILE FABRICS AND METHODS OF THEIR MANUFACTURE AND USE

(71) Applicant: JOHNS MANVILLE, Denver, CO (US)

(72) Inventors: Werner Groh, Schwabmunchen (DE); Agnes Frick, Gunzburg (DE)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 16/580,833

(22) Filed: Sep. 24, 2019

(65) Prior Publication Data

US 2020/0017732 A1    Jan. 16, 2020

Related U.S. Application Data

(62) Division of application No. 15/706,890, filed on Sep. 18, 2017, now Pat. No. 10,472,546.

(30) Foreign Application Priority Data

Sep. 24, 2016  (DE) ............ 10 2016 011 586.6

(51) Int. Cl.
| | |
|---|---|
| *C09J 103/02* | (2006.01) |
| *D04H 3/16* | (2006.01) |
| *D04H 3/005* | (2012.01) |
| *D04H 1/4218* | (2012.01) |
| *D06N 3/00* | (2006.01) |
| *D06N 7/00* | (2006.01) |
| *D04H 1/4209* | (2012.01) |
| *D06M 15/11* | (2006.01) |
| *D04H 1/64* | (2012.01) |
| *D06M 15/333* | (2006.01) |
| *C09D 103/02* | (2006.01) |
| *D04H 3/004* | (2012.01) |
| *C08L 3/02* | (2006.01) |
| *D04H 1/587* | (2012.01) |
| *D04H 3/12* | (2006.01) |

(52) U.S. Cl.
CPC ............ *C09J 103/02* (2013.01); *C08L 3/02* (2013.01); *C09D 103/02* (2013.01); *D04H 1/4209* (2013.01); *D04H 1/4218* (2013.01); *D04H 1/587* (2013.01); *D04H 1/64* (2013.01); *D04H 3/004* (2013.01); *D04H 3/005* (2013.01); *D04H 3/12* (2013.01); *D04H 3/16* (2013.01); *D06M 15/11* (2013.01); *D06M 15/333* (2013.01); *D06N 3/0011* (2013.01); *D06N 3/0022* (2013.01); *D06N 7/0081* (2013.01); *D06M 2200/12* (2013.01); *D06M 2200/30* (2013.01); *D06N 2201/08* (2013.01); *D06N 2201/082* (2013.01); *D06N 2203/028* (2013.01); *D06N 2203/045* (2013.01); *D06N 2209/103* (2013.01); *D06N 2209/128* (2013.01); *D06N 2209/142* (2013.01); *D06N 2211/063* (2013.01); *D06N 2211/066* (2013.01); *D06N 2211/30* (2013.01)

(58) Field of Classification Search
CPC ............ C09J 103/02; D06N 2203/028; D06N 3/0022; D06N 7/0081; D06N 3/0011; D06N 2211/066; D06N 2211/063; D06N 2209/142; D06N 2209/128; D06N 2201/082; D06N 2203/045; D06N 2201/08; D06N 2209/103; D06N 2211/30; D04H 3/12; D04H 3/16; D04H 3/005; D04H 1/4218; D04H 1/4209; D04H 1/64; D04H 3/004; D04H 1/587; D06M 15/11; D06M 2200/12; D06M 2200/30; D06M 15/333; C09D 103/02
USPC .......................................................... 524/52
See application file for complete search history.

(56) References Cited

U.S. PATENT DOCUMENTS

| | | | |
|---|---|---|---|
| 5,405,653 A | 4/1995 | Hayes et al. | |
| 2010/0129593 A1* | 5/2010 | Rempt | C08L 33/02 428/95 |

FOREIGN PATENT DOCUMENTS

| | | |
|---|---|---|
| EP | 0 354 023 A2 | 2/1990 |
| EP | 2 679 624 A1 | 1/2014 |
| EP | 2 924 071 A1 | 9/2015 |
| EP | 2 987 827 A1 | 2/2016 |
| EP | 2 309 046 B1 | 8/2017 |

* cited by examiner

*Primary Examiner* — Hui H Chin
(74) *Attorney, Agent, or Firm* — Robert D. Touslee

(57) ABSTRACT

Textile fabrics consolidated with a binder that is made from a binder system are described. The binder system may include:
  a) 30% or less by dry weight of at least one polymer based on polyvinyl alcohol;
  b) 70% or more by dry weight of at least one starch, wherein the at least one starch comprises 50% by weight or more of one or more natural starches based on the total weight of the at least one starch;
  c) 0 to 10% by dry weight of at least one crosslinker;
  d) 0 to 10% by dry weight of at least one filler; and
  e) 0 to 10% by dry weight of at least one additive,
wherein a sum of components a) through e) is 100% by dry weight of the binder system. Method of making the textile fabrics consolidated with binders made from the binder systems are also described.

27 Claims, No Drawings

BINDER-CONSOLIDATED TEXTILE FABRICS AND METHODS OF THEIR MANUFACTURE AND USE

CROSS REFERENCE TO RELATED APPLICATIONS

This application is a divisional of pending U.S. application Ser. No. 15/706,890, filed Sep. 18, 2017 which claims foreign priority to DE 10 2016 011 586.6, filed Sep. 24, 2016.

FIELD OF THE INVENTION

The invention relates to novel binder systems for consolidating textile fabric, textile fabrics consolidated thereby, their manufacture, as well as products containing the binder system or a textile surface equipped therewith.

BACKGROUND OF THE INVENTION

Textile fabrics, in particular those which are used as an insert for the manufacture of coated materials, must meet a wide range of requirements. Examples of the use of such inserts are, among other things, textile backings for fitted carpets, textile reinforcements in PVC flooring or roofing sheets.

When used in the manufacture of roofing sheets, the inserts or reinforcing inserts used must have sufficient mechanical stability, such as good perforation strength and good tensile strength, which are brought about, for example, upon further processing, such as bituminization or laying. In addition, a high resistance to thermal stress, for example in the case of bituminizing or against radiant heat, and resistance to flying sparks is required.

When used in the manufacture of coated flooring, for example PVC flooring, additional demands are placed on such inserts. In this field of application, in addition to the mechanical/thermal requirements, the inserts must also avoid the formation of gaseous substances, since otherwise, blistering would be observed during manufacture, for example by the formation of water vapor. Blistering of this kind is highly problematic and leads to losses in yield or to poorer quality.

Additional requirements are placed on such inserts for use in the manufacture of surfaces in the interior and exterior of buildings. In this field of application, in addition to the mechanical/thermal requirements, the inserts must also have decorative properties which remain unchanged or almost unchanged over a long period of time.

In addition to the aforementioned technical requirements, environmental compatibility or new legal regulations are also responsible for the replacement of existing, occasionally properly functioning systems with new, compliant systems. Examples in this regard include new industrial standards, such as DIN EN 14041, or legislative changes, such as REACH.

The binding systems used hitherto for consolidating textile surfaces are based on thermoplastic and/or thermoset binder systems. Examples which may be mentioned here are aminoplasts and binders based on acrylates.

EP-A-2192153 discloses binder systems based on crosslinked polycarboxylates and starch. EP-A-2987827 describes binder systems based on polyacrylates, wherein these are not crosslinked by means of a low molecular weight crosslinker, and starch. Further binder systems based on polyvinyl acetate and starch are known from EP-A-2607533. The binder systems described are already very well suited for the manufacture and consolidation of textile fabrics and have good heat resistance. For some applications, however, the wet strength and color stability should be improved. Furthermore, a reduction in binder costs is an important goal of binder development. In addition, the ever-increasing demand for binder systems which are predominantly based on renewable raw materials has to be met.

There is thus a considerable need for the provision of novel binder systems for consolidating textile surfaces which are intended to be used as inserts, which on the one hand satisfy the technical requirements and the legal provisions, and on the other hand are economically accessible. In addition, novel binder systems should be able to be used in existing production systems and applied by means of known methods and equipment. The novel binder systems should predominantly be based on renewable raw materials.

BRIEF SUMMARY OF THE INVENTION

Novel binder systems for consolidating textile surfaces are described that on the one hand meet the technical requirements and the legal provisions, while on the other hand are economically accessible and additionally have improved color stability over a longer period of time. Process of making the binder systems are also described. The present binder systems may be made from renewable raw materials. Exemplary binder systems may have 50% by weight or more, in some instances 70% by weight or more (based on the dry weight of the binder system) sourced from naturally occurring and renewable raw materials.

Embodiments of the invention include a textile fabric which is consolidated with a binder that is made from a binder system comprising:
a) 30% or less by weight of polymers based on polyvinyl alcohol, and
b) 70% or more by weight of starch, preferably a natural starch or a mixture of a natural starch with other natural starches or preferably a natural starch or a mixture of one or more natural starches with other starches, wherein the mixture has a minimum of 50% by weight of natural starch(es),
c) 0 to 10% by weight of crosslinker,
d) 0 to 10% by weight of fillers,
e) 0 to 10% by weight of additives,
wherein the specifications regarding the proportions by weight are based on the dry mass of the binder system, i.e., without water, and the sum of the components a) to e) is 100% by weight.

In additional examples, the at least one polymer based on polyvinyl alcohol may be 20% or less by dry weight of the binder system. For example, the at least one polymer based on polyvinyl alcohol may range from 1% to 20% by dry weight of the binder system. Examples also include the at least one starch being 80% or more by dry weight of the binder system. For example the binder system may include 80% to 99% by dry weight of the starch.

Additional embodiments of the binder system may include:
a) 30% or less by dry weight of polymers based on polyvinyl alcohol, with additional ranges for the polymers based on polyvinyl alcohol include (i) 20% or less by dry weight, and 1 to 20% by dry weight, and
b) 70% or more by dry weight of starch, with additional ranges for the starch including (i) 80% or more by dry weight, and (ii) 80% to 99% by weight of starch, and wherein the starch may include a natural starch or a mixture of a natural starch with other natural starches or a natural starch that is a mixture of one or more natural starches with other starches, wherein the mixture has a minimum of 50% by weight of natural starch(es), and c) 0 to 10% by weight of crosslinker,
d) 0 to 10% by weight of fillers,
e) 0 to 10% by weight of additives, wherein the specifications regarding the proportions by weight are based on the dry mass of the binder system, i.e., without water, and the sum of the constituents a) to e) is 100% by weight, and its use for consolidating textile fabrics.

Embodiments also include methods for consolidating textile fabrics by application of a binder system comprising:

a) 30% or less by weight of one or more polymers based on polyvinyl alcohol, with additional one or more polymers having ranges that include (i) 20% or less by dry weight, and (ii) 1 to 20% by dry weight, and b) 70% or more by weight of starch, with additional starch ranges including (i) 80% or more by weight, and (ii) 80% to 99% by weight, and wherein the starch may include a natural starch or a mixture of a natural starch with other natural starches or a natural starch that is a mixture of one or more natural starches with other starches, wherein the mixture has a minimum of 50% by weight of natural starch(es), and c) 0 to 10% by weight of crosslinker,
d) 0 to 10% by weight of fillers,
e) 0 to 10% by weight of additives, wherein the specifications regarding the proportions by weight are based on the dry mass of the binder system, i.e., without water, and the sum of the constituents a) to e) is 100% by weight, onto a textile fabric and subsequent drying and curing of the binder system.

In additional embodiments, the binder system may have a proportion of the component a) (polymers based on polyvinyl alcohol) as 20% or less by weight, for example 1 to 20% by weight. Embodiments of the binder system may further include a proportion of the component b) (starch) as 80% or more by weight, for example 80 to 99% by weight. Still further embodiments of the binder system may have the sum of the components a) and b) being at least 80% by weight, for example at least 85% by weight, at least 90% by weight, etc. Embodiments may also include binder systems having component c) (crosslinker) as at least 0.1% by weight.

After drying, the quantity of the binder system applied to the textile fabric may be between 5 and 50% by weight of dry binder, based on the total weight of the raw textile fabric. Additional ranges may include 10 and 30% by weight of the dry binder, and 10 and 25% by weight of the dry binder. For applications in the field of filtration products, exemplary quantities of the binder system include a range from 5 and 25% by weight of the dry binder.

Exemplary binder systems may be applied as an aqueous dispersion or solution in the making of the textile fabric. The viscosity of these aqueous binder systems include ranges from 50 to 20000 mPa*s, 100 to 8000 mPa*s, and 900 to 4000 mPa*s, among others (determined according to DIN EN ISO 2555 and at 23° C.). Exemplary binder systems include true dispersions, colloidally disperse or molecularly disperse dispersions, and partial dispersions (i.e., aqueous systems, which are partially molecularly disperse and partly colloidally disperse).

The textile fabric consolidated by the binder system may have a significantly higher proportion of natural starch (i.e., unmodified renewable raw materials) compared with consolidated textile fabrics based on modified starches, without adversely affecting the mechanical properties of the consolidated textile fabric. The textile fabrics consolidated by means of the binder system can have good wet strength and excellent mechanical strength, while also being cheaper to produce. The same applies to dimensional stability upon heating, which is also maintained despite exchanging significant proportions of component a) for components b). Despite the high proportion of component b), the brittleness of textile fabric consolidated by means of the binder system according to the invention is quite low. Furthermore, the binder system according to the invention is slightly hygroscopic, so that no restrictions can be envisaged on using the consolidated textile fabrics as reinforcing inserts in the manufacture of PVC flooring, for example by blistering. The aging behavior of the consolidated textile fabrics, which is almost constant, is also surprising.

In addition, it has been found that embodiments of the binder system have good miscibility. The combination of polymers based on polyvinyl alcohol, and starch (e.g., natural starch(es) or mixtures of starches which predominantly (e.g., at least 50% by weight) include natural starch (es), results in binder systems which have a high homogeneity. The aggregation of binder components, which frequently occurs in binder mixtures, may be avoided. This high homogeneity results in a good distribution of the binder system on and in the textile fabric during the application of the binder system, which in turn leads to homogeneous properties of the consolidated textile fabric.

Compared with a textile fabric which exclusively has starch as the binder component, the textile fabric consolidated according to the invention is improved or at least equivalent in terms of its hygroscopic behavior, strength, in particular wet and hot strength, brittleness, aging behavior and flexibility. Considerable cost savings arise because of the predominant use of starch, such as natural starch. In addition, a completely formaldehyde-free binder system can be obtained that does not cause a deterioration in the product properties, in particular with respect to the mechanical properties of the textile fabric, such as, strength, for example.

The present binder systems can be applied to the textile fabric with surprisingly high solids concentrations. It was believed that most binder systems that included natural starch (e.g., native starch) would not reach binder content of 15% by weight (based on the binder content after drying, based on the total weight of the raw textile fabric) in a single application. The present binder systems can have a solids concentration of 5% by weight or more, where the specifications regarding the proportions by weight are based on the dry mass of the binder system (i.e., without water) and the sum of constituents a) to e) is 100% by weight.

DETAILED DESCRIPTION OF THE INVENTION

Binder Component A) (Polymers)

The polymers based on polyvinyl alcohol used as Component a) may include polyvinyl alcohols which have a degree of saponification of 80-99%. Fully saponified polyvinyl alcohols may also be used.

The polymers based on polyvinyl alcohol can have up to 5 mol % of other co-monomer units, For example, the polymers may have monomer units based on ethylene so that, in addition to the polyvinyl alcohol homopolymers, co- or terpolymers are also included. The polymers based on polyvinyl alcohols may be homopolymers. The polymers based on polyvinyl alcohol include commercially available polyvinyl alcohols, for example those sold by Kuraray under the name POVAL® or Mowiol®.

The polymers based on polyvinyl alcohol can be mixed with the natural starch as an aqueous dispersion or solution, or in powdered form. The components can be pre-mixed individually or together in water and heated to a temperature below the boiling point of water, (e.g., 70-95° C.) and adjusted with regard to the viscosity. The binder system is then adjusted to the application temperature and can be heated or cooled as required.

Insofar as component a) of the binder system according to the invention is to be used as an aqueous polymer dispersion, conventional and known emulsifiers or protective colloids can be added for stabilization. Examples of emulsifiers are polyglycol ethers, fatty alcohol polyglycol ethers, phosphoric acid esters and their salts, sulfonated paraffin hydrocarbons, higher alkyl sulfates (e.g., lauryl sulfate), alkali metal salts of fatty acids such as sodium stearate or sodium oleate, sulfuric acid half-esters of ethoxylated fatty acid alcohols, salts of esters and half-esters of alkylpolyoxyethylene sulfosuccinates, salts of sulfonated alkylaromatics such as, for example, sodium dodecylbenzenesulfonate, ethoxylated C4-C12 alkylphenols and their sulfonation products, and esters of sulfosuccinic acid. Examples of protective colloids are alkylhydroxyalkylcelluloses, partially or fully hydrolyzed polyvinyl alcohols and copolymers thereof, acrylic acid, homo- and copolymers and partially neutralized salts thereof, acrylamide copolymers, polyacrylate copolymers and salts thereof, carboxyalkylcellulose, such as carboxymethylcellulose and salts thereof.

Component a) can be a true dispersion, a colloidally disperse or molecularly disperse dispersion, or as a partial dispersion. In partial dispersions, the aqueous system is partially molecularly disperse and partly colloidally disperse.

Insofar as Component a) is used as an aqueous polymer dispersion or polymer solution, the solids content may include ranges of between 5-30% by weight, between 5 and 20% by weight, and between 7 to 15% by weight (determined according to DIN EN ISO 3251).

Insofar as Component a) of the binder system is used as an aqueous polymer dispersion, the viscosity of the dispersion may include ranges from 50 to 20000 mPa*s, 100 to 8000 mPa*s, and 900 to 4000 mPa*s (determined according to DIN EN ISO 2555 and at 23° C.).

Insofar as the component a) of the binder system is used as an aqueous polymer dispersion, the pH (measured as a 10% by weight solution in water) may be between 4 and 8, for example between 4.5 and 7.0 (determined according to DIN ISO 976).

Embodiments may include binder systems with essentially no additional polyacrylate dispersion based on acrylic acid and/or modified acrylic acid, especially methacrylic acid, monomers, as well as maleic acid/maleic anhydride and/or styrene maleic anhydride (SMA). In this context, "essentially" means that up to 10% by weight of the polyvinyl alcohol is replaced by polyacrylates, wherein the total quantity of components a) remains unchanged. Embodiments of the binder system may have essentially no additional polyacrylate dispersion.

Embodiments may further include binder systems with essentially no additional polyvinyl acetate dispersions. In this context, "essentially" means that up to 10% by weight of the polyvinyl alcohol is replaced by polyvinyl acetate, wherein the total quantity of components a) remains unchanged. Embodiments may further include binder systems with essentially no additional polyvinylacetate dispersions.

Binder Component B) (Starch)

The starches used are not subject to any restrictions, but should be compatible with the Component a) and, if present in the binder system Components c), d) and e). Suitable starches include natural starches (which are also called native starches) and modified starches. The starches may have sufficient cold solubility and/or hot solubility.

Exemplary starches may be a single type of natural starch or a mixture of two or more types of natural starches. Exemplary starches may also include a natural starch or a mixture of one or more natural starches with other starches, wherein the mixture has a minimum of 50% by weight of natural starch(es).

Exemplary natural starches may include the starches obtained from vegetable raw materials. These include, among others, starches from tubers such as potatoes, manioc, maranta, batata, from grain such as wheat, maize, rye, rice, barley, millet, oats, sorghum, from fruits such as chestnuts, acorns, beans, peas, and other legumes, bananas, as well as from plant pulp, e.g., from the sago palm.

Exemplary starches also include starches that consist essentially of amylose and amylopectin in varying proportions.

The molecular weights of the starches vary over a wide range. Exemplary starches made from a mixture of amylose and amylopectin may have molecular weights $M_w$ in ranges that include $5 \times 10^2$ and $7 \times 10^{10}$ Daltons, and $5 \times 10^4$ and $1 \times 10^8$ Daltons.

Exemplary starches of the binder system may consist essentially of a single natural starch, or mixtures of two or more natural starches.

In the present Application, "other" starches include non-natural starches such as modified starches, cationic or anionic starches, and starch derivatives (so-called chemically modified starches).

In addition to starches of native plant origin, modified starches which are chemically modified, obtained by fermentation, of recombinant origin or are produced by biotransformation (biocatalysis) may also be used in exemplary binder systems. A synonym for the term "biotransformation" that is also used is the term "biocatalysis". "Chemically modified starches" can be understood to mean those starches the properties of which have been chemically modified in comparison with the natural properties. This is achieved essentially by polymer-analogous reactions in which starch is treated with mono-, bi- or polyfunctional reagents or oxidizing agents. The hydroxyl groups of the starch are preferably converted by etherification, esterification or selective oxidation, or the modification is based on a free-radical-initiated graft copolymerization of copolymerizable unsaturated monomers onto the starch backbone. Specific chemically modified starches include, among others, starch esters such as xanthogenates, acetates, phosphates, sulfates, nitrates, starch ethers such as, e.g., non-ionic, anionic or cationic starch ethers, oxidized starches such as dialdehyde starch, carboxy starch, persulfate-degraded starches and like substances.

Exemplary starches may also include "fermentative starches" that are obtained by fermentative processes using naturally occurring organisms such as fungi, algae or bacteria, or can be obtained by activating and using fermentative processes. Examples of starches from fermentative processes include, among others, gum arabic and related polysaccharides (gellan gum, gum ghatti, gum karaya, gum tragacanth), xanthan, emulsan, rhamsan, wellan, schizophyllan, polygalacturonate, laminarine, amylose, amylopectin and pectins.

Exemplary starches may further include starches of recombinant origin (also called "recombinant starches"). Recombinant starches include starches that are obtained by fermentative processes using organisms not occurring in nature, but natural organisms modified with the help of genetic methods, such as fungi, algae or bacteria, or which can be obtained by activating and using fementative processes. Examples of starches from fermentative, genetically modified processes are, among others, amylose, amylopectin and polyglucans.

Exemplary starches also include starches manufactured by biotransformation. These starches include amylose, amylopectin or polyglucans that are prepared by catalytic reaction of monomeric basic building blocks, generally oligomeric saccharides, in particular mono- and disaccharides, in which a biocatalyst (also: enzyme) is used under specific conditions. Examples of starches from biocatalytic processes are, among others, polyglucan and modified polyglucans, polyfructan and modified polyfructans.

Exemplary starch derivatives (also called "derivatives of starches") include modified starches, e.g., those starches in which the natural amylose/amylopectin ratio has been modified in order to alter their properties, a pre-gelatinization has been carried out, partial hydrolytic degradation has been carried out or chemical derivatization has been carried out. Specific derivatives of starches include, among others, oxidized starches, e.g., dialdehyde starch or other oxidation products containing carboxyl functions, or native ionic starches (e.g., with phosphate groups) or further ionically modified starches, this meaning that both anionic and cationic modifications are included.

Exemplary destructurized starches may also be included in the binder systems. These include starches which have been homogenized, for example, by means of glycerin, so that no more crystalline reflections occur in the X-ray diffraction diagram and starch granules or double-breaking regions are no longer visible at a magnification of 1000 under the polarization microscope. In this connection, reference is made to DE-A1-3931363, the disclosure of which also forms part of this description of the destructured starches, the entire contents of which are herein incorporated by reference for all purposes.

Embodiments of the binder systems include binder systems that use natural starches and do not contain any modified starches, for example starches which are chemically modified, are fermentatively obtained, are of recombinant origin or have been manufactured by biotransformation (biocatalysis).

Examples of starches that can be included in the present binder systems include starches that are commercially available, for example from Avebe, Cargill, National Starch, Penford Products Co Purac or Südstärke.

Exemplary starches may have sufficient cold solubility and/or sufficient hot solubility for the binder system. A sufficient solubility is provided when the viscosity of the binder system permits appropriate processability.

Binder Component C) (Crosslinker)

Exemplary binder systems may also contain up to 10% by weight of one or more crosslinkers. The crosslinkers used as component c) may include synthetic resins based on urea-formaldehyde (UF), melamine-formaldehyde (MF) or mixtures (MUF). Additional examples of crosslinkiner component c) include polyisocyanate compounds, for example tolylene diisocyanate, hydrogenated tolylene diisocyanate, adducts of trimethylolpropane and tolylene diisocyanate, triphenylmethane triisocyanate, methylenebis (4-phenylmethane) triisocyanate, isophorone diisocyanate, their reaction products with ketoxime or phenol; polyaldehydes, for example glyoxal, succindialdehyde, malonaldehyde, maleic acid dialdehyde, phthalic acid dialdehyde, glutaric acid aldehyde, adipaldehyde; polyepoxy compounds, for example ethylene glycol diglycidyl ether, polyethylene glycol diglycidyl ether, glycerol diglycidyl ether, glycerol triglycidyl ether, 1,6-hexanediol diglycidyl ether, trimethylolpropane triglycidyl ether, diglycidylaniline, diglycidylamine; polyamine compounds, for example urea, melamine, methylolurea, methylolmelamine, hexamethylenediamine, triethanolamine; compounds which can form a radical, for example, hydrogen peroxide, potassium peroxodisulfate, ammonium persulfate, benzoyl peroxide, succinic acid peroxide, t-butyl peroxymaleate, benzoin alkyl ethers, e.g., t-butyl hydroperoxide benzoin methyl ether, benzoin ethyl ether and benzoin isopropyl ether, organic sulfur compounds such as dibutylsulfide, benzylsulfide and decylphenylsulfide, a diazonium salt and a triazonium salt, their double salts with zinc chloride or its condensation product, azobisisobutyronitrile, 2,2'-azobis (2-amidinopropane) dihydrochloride, dyes such as, e.g., methylene blue or a combination of the p-toluenesulfonate ion with it, a pyrylium salt, a thiapyrylium salt, ammonium dichromate, acetophenone, benzophenone, benzil, phenanthrene, thioxanthone, dichloropropylphenyl ketone, anthraquinone, 2-chloroanthraquinone, 2-bromoanthraquinone, sodium anthraquinone β-sulfonate, 1,5-dinitro anthraquinone, 1,2-benzanthraquinone, phenanthrenequinone, 5-benzoylacetonaphthene, 5-nitroacetoneaphthene, 1,4-naphthoquinone, 1,8-phthaloylnaphthalene, 2-nitrofluorene, p-nitroaniline, picramide;

oxidizing agents, for example potassium dichromate, ammonium dichromate, calcium perchlorate; polymerizable monomers, for example 2-hydroxyethyl acrylate, 2-hydroxyethyl methacrylate, 2-hydroxypropylacrylate, 2-hydroxypropyl methacrylate, N-vinylpyrrolidone, 2-hydroxyethylacryloylphosphate, acrylamide, methacrylamide, N-methylolacrylamide, N-methylolmethacrylamide, N-methoxymethylacrylamide, N-ethoxy-methylacrylamide, ethylene glycol monoacrylate, dipropylene glycol monoacrylate, N,N-dimethylaminoethylacrylate, styrene, vinyltoluene, monochlorostyrene, diallylphthalate, vinyl acetate, glycidyl methacrylate;

salts of polyvalent metals, for example a chloride, bromide, nitrate, sulfate or acetate of a polyvalent metal such as aluminum, iron, copper, zinc, tin, titanium, nickel, antimony, magnesium, vanadium, chromium or zirconium, in particular copper (II) chloride, aluminum chloride, iron (III) chloride, tin (IV) chloride, zinc chloride, nickel (II) chloride, magnesium chloride, aluminum sulfate, copper (II) acetate, chromium acetate and the like. However, the crosslinkers which can be used according to the invention are not limited to the aforementioned examples.

Exemplary crosslinkers for the present binder systems that are commercially available include Polycup 9200 polyamide epichlorohydrin, Encor 3875 (polyacrylic acid with sodium hypophosphite catalyst) and ammonium zirconium carbonate.

The crosslinkers used in the present binder systems may also include crosslinking catalysts. Exemplary crosslinking catalysts may include alkali metal hypophosphites and alkali metal phosphite catalysts. Exemplary crosslinking catalysts may also include alkali/alkaline earth phosphinate, for example sodium phosphinate. The presence of the catalyst causes the crosslinking reaction between OH groups of the starch that is present and the carboxylic acid from the polymers that is present to be accelerated and additionally brings about a markedly reduced yellowing for the same thermal load during curing of the binder system. Crosslinking catalysts can also increase the thermodimensional stability of the textile fabric.

Binder Component D) (Fillers)

Exemplary binder systems can also contain up to 10% by weight of filler. Suitable fillers include inorganic fillers of natural and/or synthetic origin. The inorganic fillers are, for example, mineral fillers, preferably loam, clay, calcined loam, calcined clay, lime, chalk, natural and/or synthetic carbonates, natural and/or synthetic oxides, carbides, natural and/or synthetic hydroxides, sulfates and phosphates, based on natural and/or synthetic silicates, silicas, silicon and/or quartz, fluorite or talc. Optionally, the fillers are silanized or rendered additionally hydrophobic.

Binder Component E) (Additives)

Exemplary binder systems can also contain up to 10% by weight of additives. These include commercially available additives such as preservatives, stabilizers, anti-oxidants, defoamers, hydrophobing agents, UV stabilizers, plasticizers, adhesion promoters, wetting agents, foaming auxiliaries and/or pigments. These are contained in commercial products to some extent and serve to stabilize storage and transport or can also be added subsequently in order to meet the customers specifications.

Adhesion promoters promote adhesion of the binder to the surface of the fibers of the textile fabric. Depending on the type of fiber, various adhesion promoters may be used. Insofar as the textile fabric has glass fibers, silanes, such as organo-functionalized silanes, may be used as an adhesion promoter. Examples of commercially available adhesion promoters include silane A187 sold by, among others, by the company Momentive under the name Silquest A-187.

Textile Fabric

In the context of this description, the term "textile fabric" should be understood in its broadest sense. Thus, this encompasses structures made from fibers which have been manufactured according to a fabric-forming technique. The fiber-forming materials are natural fibers, mineral fibers, glass fibers, fibers formed from synthetic products and/or fibers formed from synthesized polymers. Woven fabrics, mats, knitted fabrics, crocheted fabrics, and non-woven fabrics can also be understood to constitute textile fabrics in the context of the present invention.

The textile fabrics based on mineral fibers and/or glass fibers include non-woven fabrics based on mineral fibers and/or glass fibers. The aforementioned non-woven fabrics based on mineral fibers and/or glass fibers can also be combined with further textile fabrics, such as non-woven fabrics. The glass fiber non-woven fabrics or mineral fiber non-woven fabrics may be produced by a variety of methods. For example, glass fiber non-woven fabrics which are manufactured by means of the wet laying method, the dry laying method or the air laid technique may be used.

Chemical auxiliaries such as thickeners, defoamers, etc., may be used in the manufacturing method, for example a wet laying method. The chemical auxiliaries may be incorporated into the circulating water during the manufacture of the non-woven fabric.

When the present textile fabrics include mineral fiber non-woven fabrics the mineral fibers may be consolidated by the binder system and additionally by mechanical measures, e.g., needling or hydrodynamic needling. The mineral fibers may include carded non-woven fabrics made of filaments, e.g., continuous fibers or staple fibers. Exemplary ranges for the mean diameter of the mineral fibers include 8 to 16 μm, and 10 to 12 μm. Suitable mineral fibers include aluminosilicate, ceramic, dolomite fibers or fibers from vulcanites e.g., basalt, diabase, melaphyre. Diabase and melaphyre. These are collectively referred to as palaeobasalts, wherein diabase is also often referred to as greenstone. Exemplary ranges for the basis weight of the mineral fiber non-woven fabric include 20 to 350 $g/m^2$, and 25 to 90 $g/m^2$. The above specifications are also valid for the glass non-woven fabrics described below.

The glass fiber non-woven fabrics can be consolidated by binders or even by mechanical measures, e.g., needling or hydrodynamic needling. The glass fibers may be filaments or continuous or cut glass fibers, wherein in the latter case, exemplary ranges for the lengths of the fibers include 1 to 40 mm, and 4 to 20 mm. Exemplary mean diameters of the glass fibers include ranges of 6 to 20 μm, and 8 to 15 μm. Exemplary glass fibers include glass types such as E-glass, S-glass, R-glass and C-glass. For example the glass fiber non-woven fabric may comprise E-glass, C-glass, or a combination of both E-glass and C-glass.

The textile fabrics may also include fibers made of synthetic polymers, such as non-woven fabrics made from fibers formed from spunbonded fabric (also called spunbonds), which are produced by a random deposition of freshly melt-spun filaments. They include continuous synthetic fibers made from melt-spinnable polymer materials. Examples of polymer materials include polyamides such as polyhexamethylene diadipamide, polycaprolactam, aromatic or semi-aromatic polyamides ("aramids"), aliphatic polyamides such as nylon, semi-aromatic or fully aromatic polyesters, polyphenylene sulfide (PPS), polymers containing ether and keto groups such as, for example, polyether ketones (PEK) and polyether ether ketone (PEEK), polyolefins such as polyethylene or polypropylene, or polybenzimidazoles.

The spun non-woven fabrics may be made from melt-spinnable polyesters. Exemplary polyesters include derivatives of aromatic dicarboxylic acids and aliphatic diols. Exemplary aromatic dicarboxylic acid reactants (e.g., monomers) include divalent residues of benzenedicarboxylic acids, such as terephthalic acid and isophthalic acid. Exemplary aliphatic diols include diols having 2 to 4 carbon atoms, such as ethylene glycol. Additional examples of spun non-woven fabrics include spun non-woven fabrics having at least 85 mol % of polyethylene terephthalate. The remaining 15 mol % may comprise dicarboxylic acid units and glycol units, which act as modifiers for the physical and chemical properties of the filaments produced. Examples of such dicarboxylic acid units include residues of isophthalic acid or of aliphatic dicarboxylic acid, such as, for example, glutaric acid, adipic acid, sebacic acid; examples of modifying diol residues include longer-chain diols, e.g., of propanediol, butanediol, di- or triethylene glycol, and/or polyglycol with a molecular weight of about 500 to 2000. The polyglycol may be present in small amounts. Specific examples of melt-spinnable polyesters include at least 95 mol % of polyethylene terephthalate (PET), (e.g., unmodified PET).

The individual titers of the polyester filaments in the spun non-woven fabric may include exemplary ranges of 1 to 16 dtex, and 2 to 8 dtex. The basis weight of the fabric used according to the invention made from fibers of synthetic products, in particular of synthetic polymers, may include exemplary ranges of 20 and 500 g/m$^2$, and 40 and 250 g/m$^2$. The above specifications may also apply to spun non-woven fabrics, such as to spun non-woven fabrics based on melt-spinnable synthetic polymers (e.g., polyester).

In addition to the aforementioned spun non-woven fabrics, staple fiber sheets based on the synthetic polymers mentioned above may also be used. The individual titers of the staple fibers in the staple fiber sheet may include ranges of 1 to 16 dtex, and 2 to 8 dtex. The staple fibers may have a fiber length of 20-100 mm. The basis weight of the staple fiber sheets include ranges of 20 to 500 g/m$^2$, and 40 to 250 g/m$^2$.

In further embodiments, the textile fabrics may have at least one reinforcement, such as when used as reinforcing inserts for roofing sheets. The reinforcement may be designed in such a way that it absorbs a force such that the force-expansion diagram (at 20° C.) shows the reference force of the reinforcing insert with reinforcement compared with the reinforcing insert without reinforcement in the range of 0 to 1% elongation, and a difference of at least 10% for at least one point. In yet further embodiments, the reinforcement may be installed such that force is absorbed by the reinforcement only at higher extensions.

The reinforcements may include glass multifilaments in the form of parallel yarn sheets or layers. Usually, one reinforcement is made in the longitudinal direction of the non-woven fabric from parallel yarn sheets. The reinforcing threads can be used as such or in the form of their own textile fabric, for example as a woven fabric, mat, knitted fabric, crocheted fabric or as a non-woven fabric. Examples include reinforcements having mutually parallel reinforcing yarns, e.g., warp thread sheets, as well as mats or woven fabrics. The reference force is measured according to EN 29073, part 3, on 5 cm wide specimens with a clamping length of 200 mm. The numerical value of the preload force, expressed in centinewton, corresponds to the numerical value of the basis weight of the sample, expressed in grams per square meter.

The reinforcement may be effected by incorporating the reinforcements in the textile fabric, on at least one side of the textile fabric, or at any point of the reinforcing insert. For example, the reinforcement may be effected by incorporating one or more of them with further textile fabrics that are different from the first textile fabric, or as an independent textile fabric. For use as a reinforcing insert, the consolidated textile fabric can have further textile fabrics, in addition to the present textile fabric. These further textile fabrics may be different (e.g., have a different material) from the first-named textile fabric. In some embodiments, when the textile fabric is constructed from synthetic polymer further textile fabrics are incorporated into the reinforcing insert to optimize the application-related properties.

The textile fabrics formed from synthetic polymer may be technical products and therefore have a corresponding reference force (according to EN 29073, part 3, on 5 cm wide specimens with a 200 mm clamping length). The numerical value of the preload force, expressed in centinewton, corresponds to the numerical value of the basis weight of the sample, expressed in grams per square meter. Due to its technical character, the reference force is 10N/5 cm for weights of 20 g/m$^2$ and 600N/5 cm for weights of 250 g/m$^2$. The specific reference force M (N/5 cm/basis weight in g/m$^2$) may range from 0.1 to 1.0 Nm$^2$/gcm, for example 0.2 to 0.8 Nm$^2$/gcm.

The textile fabric consolidated by means of the binder system can have a significantly higher proportion of natural starch, e.g., unmodified renewable raw materials, compared with consolidated textile fabrics based on modified starches, without adversely affecting the mechanical properties of the consolidated textile fabric. The textile fabrics consolidated by means of the binder have good wet strength and excellent mechanical strength, and can be cheaper to produce. The same applies to dimensional stability upon heating, which can also maintained despite the exchange of significant proportions of component a) by components b). Despite the high proportion of component b), the brittleness of textile fabrics consolidated by means of the binder system is quite low. The binder system may furthermore be slightly hygroscopic such that few or no restrictions can be envisaged in using the consolidated textile fabrics as reinforcing inserts in the manufacture of PVC flooring, for example by blistering. The aging behavior of the consolidated textile fabrics, which is almost constant, is also surprising.

It has been found that the binder system can allow for very good miscibility. The combination according to the invention polymers based on polyvinyl alcohol and starch, for example natural starch(es) or mixtures of starches which predominantly, e.g., a minimum of 50% by weight natural starch(es), result in binder systems which have a high homogeneity. This high homogeneity results in a good distribution of the binder system and in the textile fabric during the application of the binder system, which in turn leads to very homogeneous properties of the consolidated textile fabric. Compared with a textile fabric which exclusively has starch as a binder component, the present consolidated textile fabrics are improved or at least equivalent in terms of its hygroscopic behavior, strength, including wet and hot strength, brittleness, aging behavior and flexibility.

Cost savings can be realized by the use starches, such as natural starch in the present binder systems. In addition, a completely formaldehyde-free binder system may be obtained which, surprisingly, does not cause a deterioration in the product properties, in particular with respect to the mechanical properties of the textile fabric such as, for example, strength.

The present binders can be incorporated into the textile fabrics in surprisingly high solids concentrations. Conventional understanding holds that binder systems which comprise natural starches, i.e., native starches, do not reach a binder content of 15% by weight [binder content after drying, based on the total weight of the raw textile fabric], in a single application. The present binder systems can have a solids concentrations that range from a minimum of 5% by weight, wherein the specifications regarding the proportions by weight are based on the dry mass of the binder system, i.e., without water, and the sum of constituents a) to e) is 100% by weight. The solids concentration of the components a) and b) of the present binder systems include ranges of 5% to 30% by weight, and 7% to 15% by weight.

The present consolidated textile fabrics can be used as reinforcing inserts, either by themselves or in combination with further textile fabrics, for coated sarking membrane, roofing and waterproofing sheets, and as a textile backing or textile reinforcement in flooring, such as fitted carpets and PVC flooring, as well as in facers, wall coatings for the interior and exterior of buildings, and furniture, since these do not suffer from yellowing compared with previous known products, in particular in the case of thermal curing of the binder system, and thus are well suited as a decorative surface. In addition, the present consolidated textile fabrics can also be used for flooring applications and in the field of filtration.

Coating Materials

Polyethylene or polyvinyl chloride, polyurethanes, EPDM or TPO (polyolefins) may be used as coating materials for flooring or carpet backings. In addition, bitumen is used for the coated sarking membranes, roofing and waterproofing sheets.

The bituminized sheets may contain at least one carrier membrane—as described above—embedded in a bitumen matrix, wherein the proportion by weight of the bitumen on the basis weight of the bituminized roofing membrane may range from 60 to 97% by weight, and that of the spun non-woven fabric may range from 3 to 40% by weight.

Manufacture

The present textile fabrics may be manufactured using a variety of methods and procedures. For example, the consolidated textile fabrics may be manufactured using the following steps:
A) providing a plurality of fibers;
B) applying a binder system to the plurality of fibers, wherein the binder system comprises:
 a) 30% or less by dry weight of at least one polymer based on polyvinyl alcohol;
 b) 70% or more by weight of at least one starch, wherein the at least one starch comprises 50% by weight or more of one or more natural starches based on the total weight of the at least one starch;
 c) 0 to 10% by weight of at least one crosslinker;
 d) 0 to 10% by weight of at least one filler;
 e) 0 to 10% by weight of at least one additive,
 wherein the sum of the components a) to e) is 100% by weight of the binder system; and
C) drying and curing the binder.

In additional embodiments, the at least one polymer based on polyvinyl alcohol may be 20% or less by dry weight of the binder system. For example, the at least one polymer based on polyvinyl alcohol may range from 1% to 20% by dry weight of the binder system. Embodiments also include the at least one starch being 80% or more by dry weight of the binder system. For example the binder system may include 80% to 99% by dry weight of the starch.

The binder system may be applied by a variety of methods, including by means of a curtain coater, foam application (e.g., foam padder), or by dipping into a binder bath, optionally removing excess binder, for example by means of suction or mechanically by rolling. Embodiments of the applied quantities and other characteristics of the binder system include those embodiments described above. The textile fabric may be formed by a variety of techniques. The mechanical consolidating of the textile fabric may also be carried out by a variety of methods.

The reinforcement, if any, may be incorporated during or after the formation of the textile fabric or before or during coating with the binder system. The supply of the reinforcement and any further optional heat treatment in the manufacturing process may be carried out under tension, in particular under longitudinal tension. Further textile fabrics may also be incorporated, and can be supplied before or during the consolidation (i.e., curing) of the binder system.

The application of the binder system in step B) may be carried out by a variety of methods. The applied binder system may be applied in quantities in ranges that include 5 to 50% by weight of dry binder, 10 to 40% by dry weight, and 15 to 30% by dry weight, based on the total weight of the raw textile fabric. Because of the nature of the binder system, it is possible for the required amount of binder system to be applied in one application step.

The consolidating and curing of the binder system can be accomplished by a variety of methods. The consolidating, curing and drying may be done at temperatures ranging from 140° C. to 250° C.

Measurement Methods

General Measurement Methods:
Basis Weight:
The basis weight is determined according to DIN EN ISO 29073-1.
Fiber Diameter Measurement:
The fiber diameter is determined according to DIN EN ISO 1973 (1995 version).
Reference Force Measurement:
The reference force is measured according to EN 29073, part 3, on 5 cm wide specimens with a clamping length of 200 mm. The numerical value of the preload force, expressed in centinewton, corresponds to the numerical value of the basis weight of the sample, expressed in grams per square meter.

What is claimed is:
1. A method for the manufacture of a textile fabric which is consolidated with a binder, the method comprising:
 providing a plurality of fibers;
 applying the binder system to the plurality of fibers, wherein the binder system comprises:
 a) 1% to 30% by dry weight of at least one polymer based on polyvinyl alcohol;
 b) 80% to 99% by dry weight of at least one starch, wherein the at least one starch comprises 50% by weight or more of one or more natural starches based on the total weight of the at least one starch;
 c) 0 to 10% by dry weight of at least one crosslinker;
 d) 0 to 10% by dry weight of at least one filler; and
 e) 0 to 10% by dry weight of at least one additive other than the filler,
 wherein a sum of components a) to e) is 100% by dry weight of the binder system, and wherein the sum of components a) and b) is at least 80% by dry weight of the binder system; and
 drying and curing the binder system on the plurality of fibers to form the textile fabric.
2. The method according to claim 1, wherein the binder system is applied in one application step.
3. The method according to claim 1, wherein the drying and curing of the binder system on the plurality of fibers comprises heating the binder system on the plurality of fiber to a temperature ranging from 140° C. to 250° C.
4. The method according to claim 1, wherein the binder system is applied to the plurality of fibers by one or more application techniques selected from the group consisting of curtain coating, foam application, and dip coating.
5. The method according to claim 1, wherein excess binder system is removed from the plurality of fibers by one or more removal techniques selected from the group consisting of suction removal and mechanical rolling.

6. The method according to claim 1, wherein the method further comprises incorporating a reinforcement into the plurality of fibers or the textile fabric.

7. The method according to claim 6, wherein the reinforcement is a roofing sheet reinforcing insert.

8. The method according to claim 1, wherein the binder system applied to the plurality of fibers is between 5% and 50% by weight of the plurality of fibers.

9. The method according to claim 1, wherein the at least one starch consists of the one or more natural starches.

10. The method according to claim 1, wherein the plurality of fibers comprise one or more types of fibers selected from the group consisting of natural fibers, mineral fibers, glass fibers, and polymer fibers.

11. The method according to claim 10, wherein the polymer fibers are melt-spinnable polymer fibers.

12. The method according to claim 10, wherein the textile fabric comprises a woven fabric, a knitted fabric, a crocheted fabric, or a non-woven fabric.

13. The method according to claim 12, wherein the non-woven fabric is a spun non-woven fabric.

14. The method according to claim 10, wherein the textile fabric is a mat.

15. The method according to claim 10, wherein the textile fabric comprises a mineral fiber non-woven fabric or a glass fiber non-woven fabric, and wherein the glass fiber non-woven fabric includes glass fibers with a basis weight between 20 and 350 g/m$^2$.

16. The method according to claim 15, wherein the glass fibers have a basis weight between 25 and 90 g/m$^2$.

17. The method according to claim 10, wherein the textile fabric comprises a non-woven fabric formed from said polymer fibers with a basis weight between 20 and 500 g/m$^2$.

18. The method according to claim 10, wherein the textile fabric comprises a non-woven fabric formed from said polymer fibers with a specific reference force M (N/5 cm/basis weight in g/m$^2$) of between 0.1 and 1.0 Nm$^2$/gcm.

19. The method according to claim 10, wherein the binder system is formaldehyde free.

20. A method of making a binder-consolidated textile fabric, the method comprising:
 providing a plurality of fibers;
 applying the binder system to the plurality of fibers, wherein the binder system comprises:
 a) 1% to 30% by dry weight of at least one polymer based on polyvinyl alcohol; and
 b) 80% to 99% by dry weight of at least one starch, wherein the at least one starch comprises 50% by weight or more of one or more natural starches based on the total weight of the at least one starch,
 wherein the sum of components a) and b) is at least 80% by dry weight of the binder system; and
 heating the binder system on the plurality of fibers to form the textile fabric.

21. The method of claim 20, wherein the binder system on the plurality of fibers is heated at a temperature ranging from 140° C. to 250° C.

22. The method of claim 20, wherein the at least one polymer based on polyvinyl alcohol is 1% to 20% by dry weight of the binder system.

23. The method of claim 20, wherein the binder system further comprises:
 0 to 10% by dry weight of at least one crosslinker;
 0 to 10% by dry weight of at least one filler; and
 0 to 10% by dry weight of at least one additive other than the filler.

24. The method of claim 23, wherein the binder system comprises at least one crosslinker.

25. The method of claim 23, wherein the binder system comprises at least one filler.

26. The method of claim 23, wherein the binder system comprises at least one additive other than the filler.

27. The method of claim 20, wherein the binder system is formaldehyde free.

* * * * *